(12) United States Patent
Kim et al.

(10) Patent No.: US 8,616,315 B2
(45) Date of Patent: Dec. 31, 2013

(54) ELECTRIC MOTOR AND ELECTRIC VEHICLE HAVING THE SAME

(75) Inventors: Yunho Kim, Seoul (KR); Jaeho Kim, Seoul (KR); Kwangwook Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 13/232,197

(22) Filed: Sep. 14, 2011

(65) Prior Publication Data

US 2012/0273286 A1    Nov. 1, 2012

(30) Foreign Application Priority Data

Apr. 27, 2011  (KR) ................. 10-2011-0039745

(51) Int. Cl.
*B60K 1/00* (2006.01)

(52) U.S. Cl.
USPC ................. 180/65.51; 180/65.1; 310/54

(58) Field of Classification Search
None
See application file for complete search history.

(56) References Cited

U.S. PATENT DOCUMENTS

| 4,958,940 A * | 9/1990 | Morrill ......................... 384/398 |
| 2010/0116184 A1 * | 5/2010 | Dennis et al. ................. 111/101 |

* cited by examiner

*Primary Examiner* — John Walters
*Assistant Examiner* — James Triggs
(74) *Attorney, Agent, or Firm* — McKenna Long & Aldridge LLP

(57) ABSTRACT

An electric motor includes a case, a stator disposed in an interior of the case, a rotor including a shaft disposed to be rotatable with respect to the stator, and an oil circulator to contact with oil that is accommodated or stored at the interior of the case, the oil circulator may disperse at least a portion of the oil when the rotor rotates with respect to the stator. Accordingly, outputs can be improved by restraining an increase in the temperature of components.

20 Claims, 9 Drawing Sheets

ELECTRIC MOTOR AND ELECTRIC VEHICLE HAVING THE SAME

The present disclosure relates to subject matter contained in priority Korean Application No. 10-2011-0039745 filed on Apr. 27, 2011, which is herein expressly incorporated by reference in its entirety.

FIELD OF THE INVENTION

The present invention relates to an electric motor and an electric vehicle having the same, and more particularly, to electric motor capable of improving outputs by reducing an internal temperature, and an electric vehicle having the same.

DESCRIPTION OF THE RELATED ART

As widely known, an electric motor is a device for converting electrical energy into mechanical energy.

The motor may include a stator and a rotor disposed to be rotatable with respect to the stator.

In general, the electric motor may further include an external case for supportedly accommodating (or housing) the stator and the rotor.

When the electric motor is driven, heat may be generated due to a copper loss, a core loss (or an iron loss), or the like.

Thus, when the temperature of the electric motor excessively increases, the output of the electric motor may be degraded due to the increase in the copper loss, the core loss, or the like.

Also, since forcible degradation of the components is accelerated due to the excessive increase in the temperature of the components, the life span of the electric motor may be shortened.

SUMMARY OF THE INVENTION

Therefore, in order to address the above matters, the various features described herein have been conceived.

An aspect of the present invention provides an electric motor capable of improving outputs by restraining an increase in the temperature of components, and an electric vehicle having the same.

Another aspect of the present invention provides an electric motor capable of reducing a material cost by restraining an increase in an internal temperature and an electric vehicle having the same.

Another aspect of the present invention provides an electric motor capable of restraining an increase in an internal temperature to improve outputs and lengthen the life span of components, and an electric vehicle having the same.

According to an aspect of the present invention, there is provided an electric vehicle including a body, a plurality of wheels provided at the body, and an electromotor to drive at least one wheel, the electromotor including a case, a stator disposed in an interior of the case, a rotor including a shaft disposed to be rotatable with respect to the stator, and an oil circulator to contact with oil that is accommodated or stored at the interior of the case, wherein the oil circulator disperses at least a portion of the oil when the rotor rotates with respect to the stator.

Here, the oil may be sufficiently accommodated or stored to at least make contact with at least a portion of the rotor, at least a portion of the stator, and at least a portion of the interior of the case.

The electric vehicle may further include one or more protrusion portions or depression portions at an inner surface of the case.

The electric vehicle may further include one or more grooves at an inner surface of the case.

The electric vehicle may further include a cooling fluid circulation circuit, one or more flow passages at the case to flow cooling fluid therethrough, at least one inlet at the case in fluid communication with the one or more flow passages, and at least one outlet at the case in fluid communication with the one or more flow passages, and the cooling fluid circulation circuit may be coupled to the at least one of the inlet and the at least one of the outlet to form a cooling fluid flow path.

The rotor may include a rotor core and one or more neodymium magnets coupled to the rotor core, wherein a characteristic of the one or more neodymium magnets may be based on a temperature of the motor when the motor is operating.

The oil circulator may be located at an end portion of the rotor.

The oil circulator may be located at an end portion of the shaft.

The oil circulator may include one or more protrusion portions or depression portions at a surface of the oil circulator.

The oil circulator may include at least two wheel bodies spaced apart in an axial direction of the shaft and a pumping unit therebetween.

According to another aspect of the present invention, there is provided a motor for use in an electric vehicle including a case, a stator disposed in an interior of the case, a rotor including a shaft disposed to be rotatable with respect to the stator; and an oil circulator to contact with oil that is accommodated or stored at the interior of the case, and the oil circulator may disperse at least a portion of the oil when the rotor rotates with respect to the stator.

The oil may be sufficiently accommodated or stored to at least make contact with at least a portion of the rotor, at least a portion of the stator, and at least a portion of the interior of the case.

The motor may further include one or more protrusion portions or depression portions at an inner surface of the case.

The motor may further include one or more grooves at an inner surface of the case.

The motor may further include one or more flow passages at the case to flow cooling fluid therethrough.

The rotor may include a rotor core and one or more neodymium magnets coupled to the rotor core, and a characteristic of the one or more neodymium magnets may be based on a temperature of the motor when the motor is operating.

The oil circulator may be located at an end portion of the rotor.

The oil circulator may be located at an end portion of the shaft.

The oil circulator may include one or more protrusion portions or depression portions at a surface of the oil circulator.

The oil circulator may further include at least two wheel bodies spaced apart in an axial direction of the shaft and a pumping unit therebetween.

The foregoing and other objects, features, aspects and advantages of the present invention will become more apparent from the following detailed description of the present invention when taken in conjunction with the accompanying drawings.

DETAILED DESCRIPTION OF THE INVENTION

Exemplary embodiments of the present invention will now be described with reference to the accompanying drawings.

Figure 1:
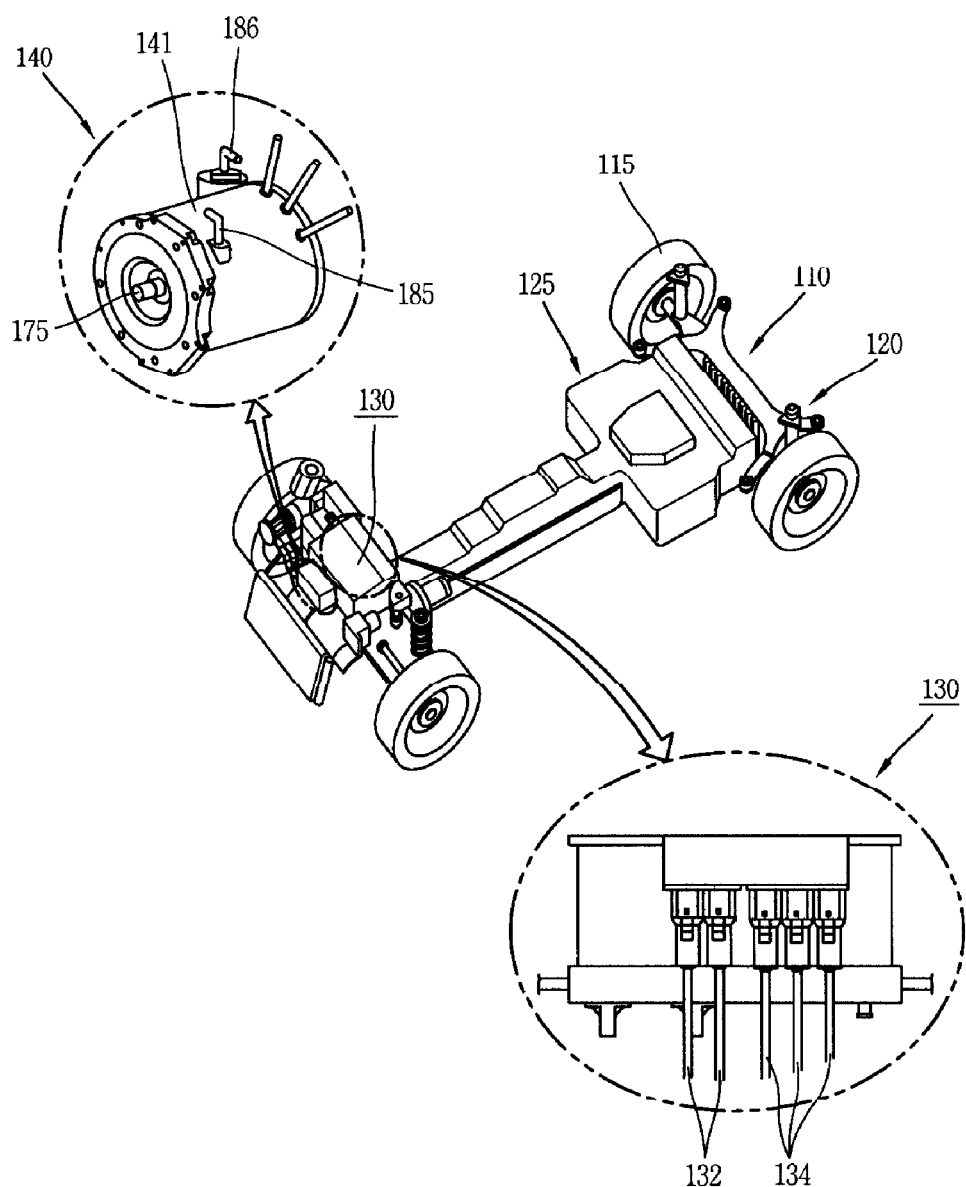
FIG. 1 is a schematic view showing an electric vehicle having an electric motor according to an exemplary embodiment of the present invention.

As shown in FIG. 1, an electric vehicle having an electric motor according to an exemplary embodiment of the present invention may include a vehicle body 110, a battery 125 provided in the vehicle body 110, and an electric motor 140 provided in the vehicle body 110 and connected with the battery 125 to provide driving force to the vehicle body 110.

Although not shown, a passenger space in which a passenger may get on (i.e., ride, board, embark, etc.) may be formed at an upper area of the vehicle body 110.

A plurality of wheels 115 allowing the vehicle to run may be provided at the vehicle body 110.

The wheels 115 may be disposed on front and rear sides of the vehicle body 110.

A suspension 120 may be provided between the vehicle body 110 and the wheels 115 in order to lessen vibration and an impact generated during running (or traveling).

The battery 125 may be provided in the vehicle body 110 in order to supply power.

The battery 125 may be configured as a rechargeable battery which can be recharged.

An electric motor 140 may be provided in the vehicle body 110 in order to provide driving force to the wheels 115.

An inverter device 130 may be provided between the electric motor 140 and the battery 125.

An input cable 132 and an output cable 134 may be provided in the inverter device 130. For example, the input cable 132 may be connected to the battery 125, and the output cable 135 may be connected to the electric motor 140. Accordingly, power provided from the battery 125 may be converted to power required for driving the electric motor 140 and provided to the electric motor 140.

Figure 2:
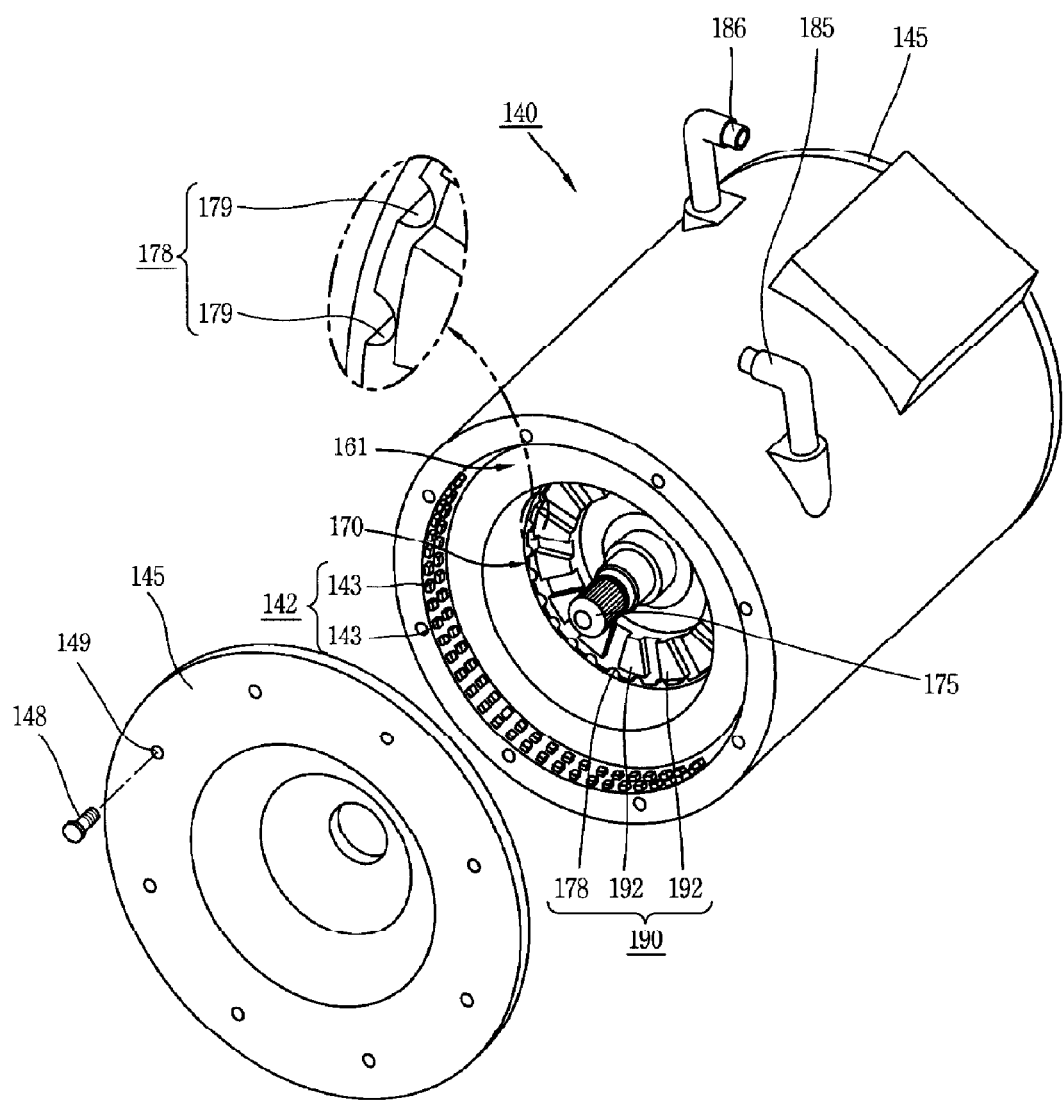
FIG. 2 is an exploded perspective view of the electric motor of FIG. 1.
Figure 3:
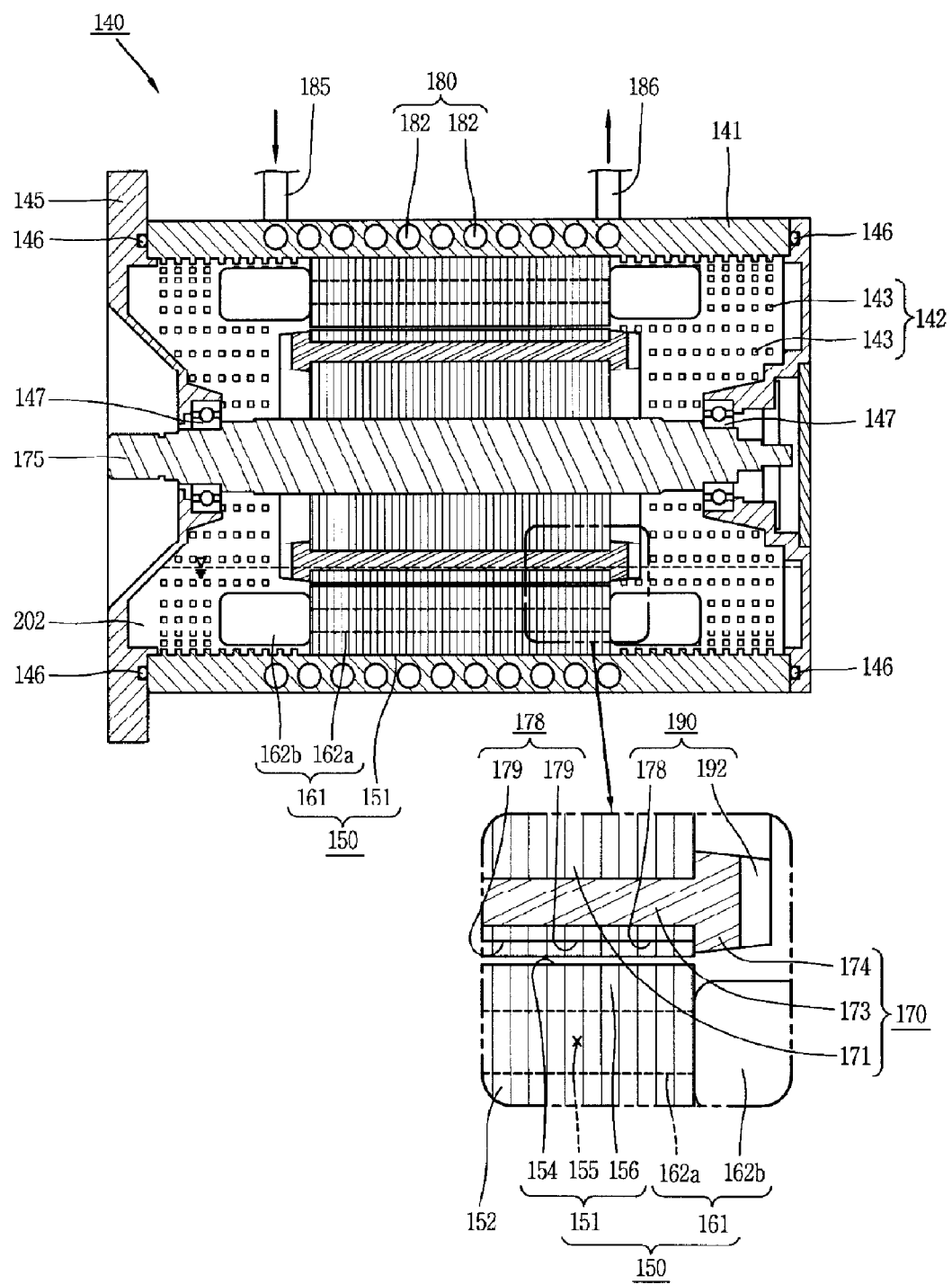
FIG. 3 is a sectional view showing a coupled state of the electric motor of FIG. 2.

As shown in FIGS. 2 and 3, the electric motor 140 may include an external case 141, a stator 150 disposed in the interior of the external case 141, a rotor 170 disposed to be rotatable with respect to the stator 150, and oil 202 accommodated in the interior of the external case 141.

The external case 141 may have an accommodation space therein.

The external case 141 may be formed such that both sides thereof are open.

Brackets 145 may be provided at both end portions of the external case 141.

The respective brackets 145 may have a disk-like shape.

Bearings 147 may be provided in the respective brackets 145.

The respective brackets 145 may be fixedly coupled to the end portions of the external case 141 through fastening members 148. A plurality of insertion holes 149 may be formed in a penetrative manner on the respective brackets 145 in order to allow the fastening members 148 to be inserted therethrough.

The brackets 145 may form a hermetically closed space cooperatively together with the external case 141. A sealing member 146 may be provided at a contact area between the external case 141 and the bracket 145 in order to maintain air-tightness between the interior and the exterior.

The stator 150 may be accommodated in the external case 141.

The stator 150 may be press-fit in the interior of the external case 141.

The stator 150 may include a stator core 151, and a stator coil 161 wound on the stator core 151.

A rotor accommodation space 154 may be formed in a penetrative manner at the center of the stator core 151. Accordingly, the rotor 170 may be rotatably accommodated with an air gap in the interior of the stator core 151.

The stator core 151 may include a plurality of slots 155 and teeth 156 formed along a circumferential direction of the rotor accommodation space 154.

The stator core 151 may be configured by laminating (or stacking) a plurality of electric steel plates 152 including the rotor accommodation space 154, the slots 155, and the teeth 156.

The stator coil 161 may be inserted into each slot 155.

The stator coil 161 may include a section 162a disposed in the interior of the slots 155 and a coil end 162b protruded in an axial direction from both end portions of the stator core 151.

The rotor 170 may be configured as a so-called induction rotor including, for example, a rotor core 171, a plurality of conductor bars 173 coupled to the rotor core 171, and an end ring 174 connecting the conductor bars 173.

A rotational shaft 175 may be coupled at the center of the rotor core 171.

The rotational shaft 175 may be rotatably supported by the bearings 147.

Oil 202 may be accommodated (or stored) in the interior of the external case 141.

The oil 202 may have excellent liquidity at a low temperature and excellent heat resistance and oxidation resistance. Preferably, the oil 202 may not have bubbles. For example, a transmission (mission) oil of a vehicle may be used as the oil 202. The oil 202 may be charged (or supplied) into the interior of the external case 141 such that it can sufficiently be contact with the external case 141, the stator 150, and the rotor 170 all at once (simultaneously).

Accordingly, heat-exchange between the external case 141, the stator 150, and the rotor 170 can be accelerated by the medium of the oil 202. Here, a charge amount of the oil 202 may be appropriately regulated in consideration of the resistance, the degree of cooling, or the like, of the rotor 170 when the rotor 170 rotates.

A depression and protrusion portion 142 may be formed on an inner surface of the external case 141. Accordingly, the surface area (inner surface) of the external case 141 may increase. Also, a contact area between the oil 202 and the external case 141 can increase to increase the amount of heat transmission.

The depression and protrusion portion 142 may include a plurality of projections 143 sticking out from the inner surface of the external case 141. In the present exemplary embodiment, the case in which the depression and protrusion portion 142 is configured to include the projections 143 is illustrated; however, in this case, the depression and protrusion portion 142 may be configured to have a plurality of grooves formed on the inner surface of the external case 141.

A flow path 182 allowing the cooling fluid to flow therethrough may be formed on the external case 141.

In detail, the cooling unit 180 having a flow path allowing the cooling fluid to flow therethrough may be provided at the external case 141. Accordingly, the external case 141 can heat-exchanged with the cooling fluid so as to be quickly cooled.

The cooling unit 180 may be, for example, configured to be wound in a spiral form (i.e., in a coil shape) having a certain diameter (i.e., the diameter of the coil) along a circumferential direction of the external case 141.

The cooling unit 180 may be configured such that it is wound (or wrapped) around the circumference of the external case 141 several times. Here, the number of windings of the cooling unit 180 may be appropriately regulated.

The cooling unit 180 may be insertedly positioned in the external case 141.

In detail, the cooling unit 180 may be inserted between outer and inner surfaces of the external case 141.

A cooling fluid inlet unit 185 and a cooling fluid outlet unit 186 may be formed on the external case 141 in order to allow the cooling fluid to flow in and out therethrough, respectively.

The cooling fluid inlet unit 185 and the cooling fluid outlet unit 186 may be provided at an upper area of the external case 141.

The cooling fluid inlet unit 185 and the cooling fluid outlet unit 186 may be configured to be upwardly protruded from the external case 141 and then bent.

The electric motor 140 may include an oil circulation unit 190 for circulating the oil 202. Accordingly, heat-exchange between the components and the oil 202 may be further accelerated.

For example, the oil circulation unit 190 may be configured to allow the oil 202 to circulate in the interior of the external case 141. Accordingly, heat-exchange among the external case, 141, the stator 150, and the rotor 170 may be further accelerated by the medium of the oil 202.

Figure 4:
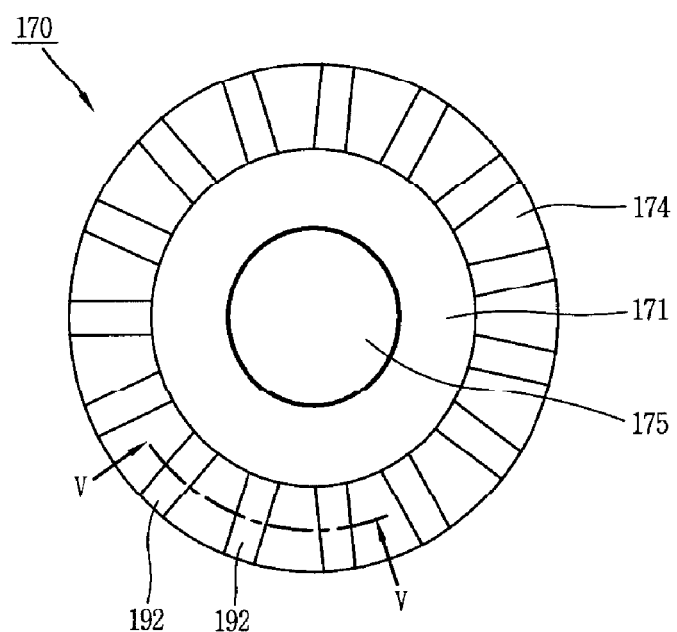
FIG. 4 is a side view of a rotor of FIG. 2.
Figure 5:
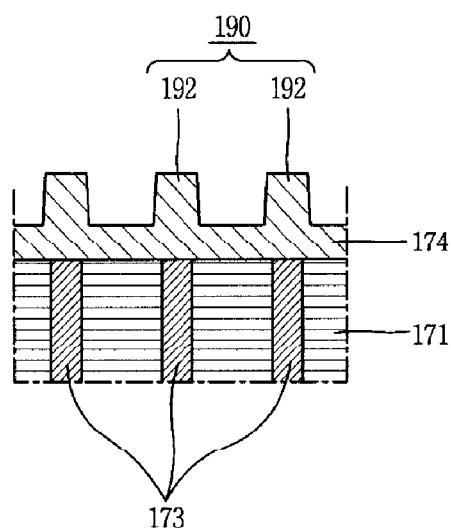
FIG. 5 is a sectional view taken along line V-V of FIG. 4.

As shown in FIGS. 4 and 5, for example, the oil circulation unit 190 may be provided at the rotor 170.

In detail, the oil circulation unit 190 may be formed on at least one end portion of the rotor 170.

The oil circulation unit 190 may include a projection 192 sticking out in an axial direction from the end portion of the rotor 170. Here, a plurality of projections 192 may be configured. For example, the projections 192 may be disposed to be separated at certain intervals along a circumferential direction at the end portion of the rotor 170. In detail, the projections 192 may be protruded in an axial direction from the end ring 174 and separated along the circumferential direction.

The oil circulation unit 190 may be formed at both end portions of the rotor 170.

The oil circulation unit 190 may include a depression and protrusion portion 178 formed on an outer circumferential surface of the rotor core 171.

The depression and protrusion portion 178 may be configured to include a plurality of grooves 179 depressed in a radial direction and extending in an axial direction on an outer circumferential surface of the rotor core 171. Accordingly, the surface area of the rotor core 171 can increase to accelerate heat-exchange between the rotor core 171 and the oil 202.

Also, the depression and protrusion portion 178 of the rotor 170 may allow the surface of the oil 202 to rise along an inner diameter surface of the stator 150 when the rotor 170 rotates.

Also, the depression and protrusion portion 178 of the rotor 170 may facilitate dispersion of the oil 202 attached to the surface of the depression and protrusion portion 178 to the outer side, i.e., to the inner diameter surface of the stator 150 by virtue of the centrifugal force. Accordingly, heat-exchange between the oil 202 and the stator 150 can be accelerated.

Meanwhile, the electric vehicle may include a cooling fluid circulation unit 210 allowing the cooling fluid to circulate by way of the electric motor 140.

Figure 6:
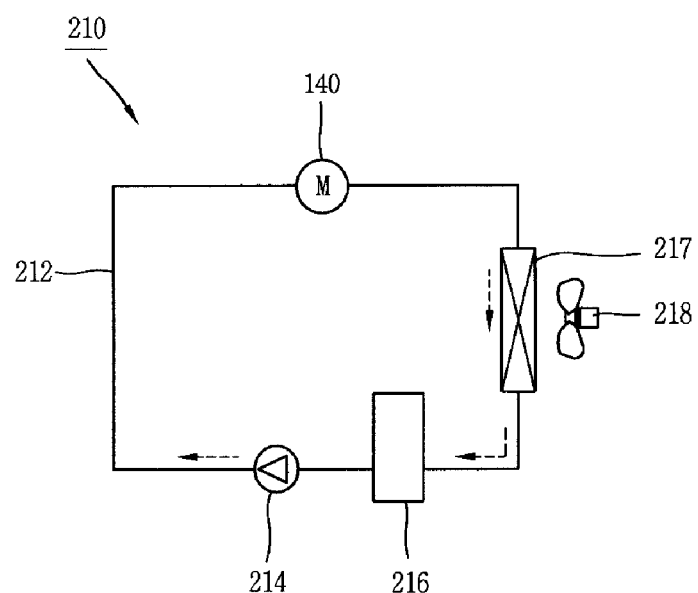
FIG. 6 is a view showing the configuration of a cooling fluid circulation unit of the electric vehicle of FIG. 1.
Figure 7:
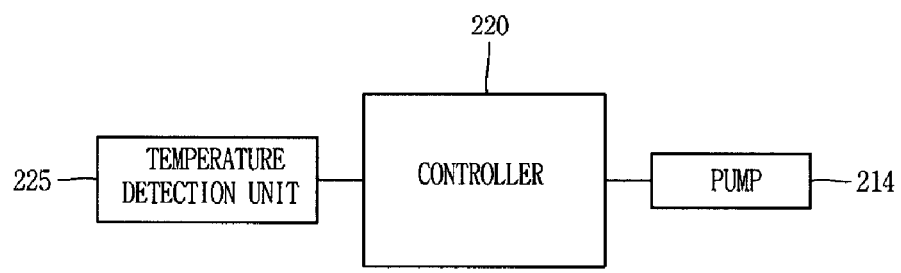
FIG. 7 is a schematic block diagram of the electric vehicle of FIG. 1.

As shown in FIG. 6, the cooling fluid circulation unit 210 may include a fluid pipe 212 forming a flow path of the cooling fluid and a flow acceleration unit for accelerating the flow of the cooling fluid. The flow acceleration unit for accelerating the flow of the cooling fluid may be implemented as, for example, a pump 214.

The cooling fluid may be configured to circulate by way of the external case 141.

One side of the fluid pipe 212 may be connected to communicate with the cooling fluid inlet unit 185 and the other side of the fluid pipe 212 may be coupled to communicate with the cooling fluid outlet unit 186.

The cooling fluid circulation unit 210 may include a tank 216 for temporarily storing the cooling fluid.

The tank 216 may be disposed at the entrance (upper stream side) of the pump 214.

The cooling fluid circulation unit 210 may include a radiator 217 allowing the cooling fluid to heat-exchange with air so as to be cooled therethrough. Accordingly, the cooling fluid at a temperature which has been increased while having passed through the electric motor 140 can be cooled.

A cooling fan 218 may be provided at one side of the radiator 217 may include a cooling fan 218 accelerating the flow of air in contact with the radiator 217.

The electric vehicle according to the present exemplary embodiment may include a controller 220 having a control program.

The controller 220 may be configured to detect the temperature of the cooling fluid to regulate a flow speed of the cooling fluid.

A temperature detection unit 225 for detecting the temperature of the cooling fluid may be connected to the controller 220 in order to output a detection signal. The temperature detection unit 225 may output the detection temperature of the cooling fluid, as an electrical signal, to the controller 220.

The pump 214 may be connected to the controller 220 such that it can be controlled by the controller 220.

With such a configuration, when power is applied to the stator 150, the stator 150 and the rotor 170 interact and the rotor 170 may rotate about the rotational shaft 175 (by being centered thereon). As the rotor 170 starts to rotate, the stator 150 and the rotor 170 may generate heat.

When power is applied to the stator 150, the controller 220 may control the pump 214 to make the cooling fluid circulate by way of the electric motor 140.

The controller 220 detects the temperature of the cooling fluid by means of the temperature detection unit 225. When the detected temperature of the cooling fluid exceeds a pre-set temperature level, the controller 220 may increase the rotation speed of the pump 214. Accordingly, the flow speed of the cooling fluid can increase to quickly cool the electric motor 140.

Meanwhile, when the rotor 170 starts to rotate, the oil 202 may circulate in the interior of the external case 141 by the oil circulation unit 190. In detail, when the rotor 170 starts to rotate, the oil 202 temporally adhered to the projections 192 may be outwardly dispersed along a radial direction by virtue of the centrifugal force. Accordingly, the contact area between the oil 202 and the stator 150 and rotor 170 increases to quickly cool the stator 150 and the rotor 170. In particular, the coil end 162b of the stator coil 161 which sticks out from the stator core 151 to have a relatively high temperature is quickly cooled, restraining an increase in temperature.

The oil 202 is dispersed by the oil circulation unit 190 so as to be brought into contact with a larger area of the external case 141 so as to be quickly cooled.

Namely, the oil 202 is brought into contact with a larger area of the stator 150 and the rotor 170 by the oil circulation unit 190 to quickly cool the stator 150 and the rotor 170, and since the oil 202 is brought into a large area of the external case 141, it can be quickly cooled. Also, since the projections 143 of the external case 141 increases the surface area of the external case 141, heat-exchange between the oil 202 and the external case 141 can be further accelerated. Accordingly, the interior of the external case 141 can be evenly cooled, and the internal temperature of the external case 141 can be managed to be a certain temperature or lower.

Another exemplary embodiment of the present invention will now be described with reference to FIGS. 8 and 9.

Illustration of the same or equivalent components as those described above will be omitted and the same or equivalent components will be described by using the same reference numerals. Also, a repeated description of some components will be omitted.

An electric vehicle having an electric motor according to another exemplary embodiment of the present invention may include the vehicle body 110, the battery 125 provided in the vehicle body 110, and the electric motor 140 provided in the vehicle body 110 and connected with the battery 125 to provide driving force to the vehicle body 110.

Figure 8:
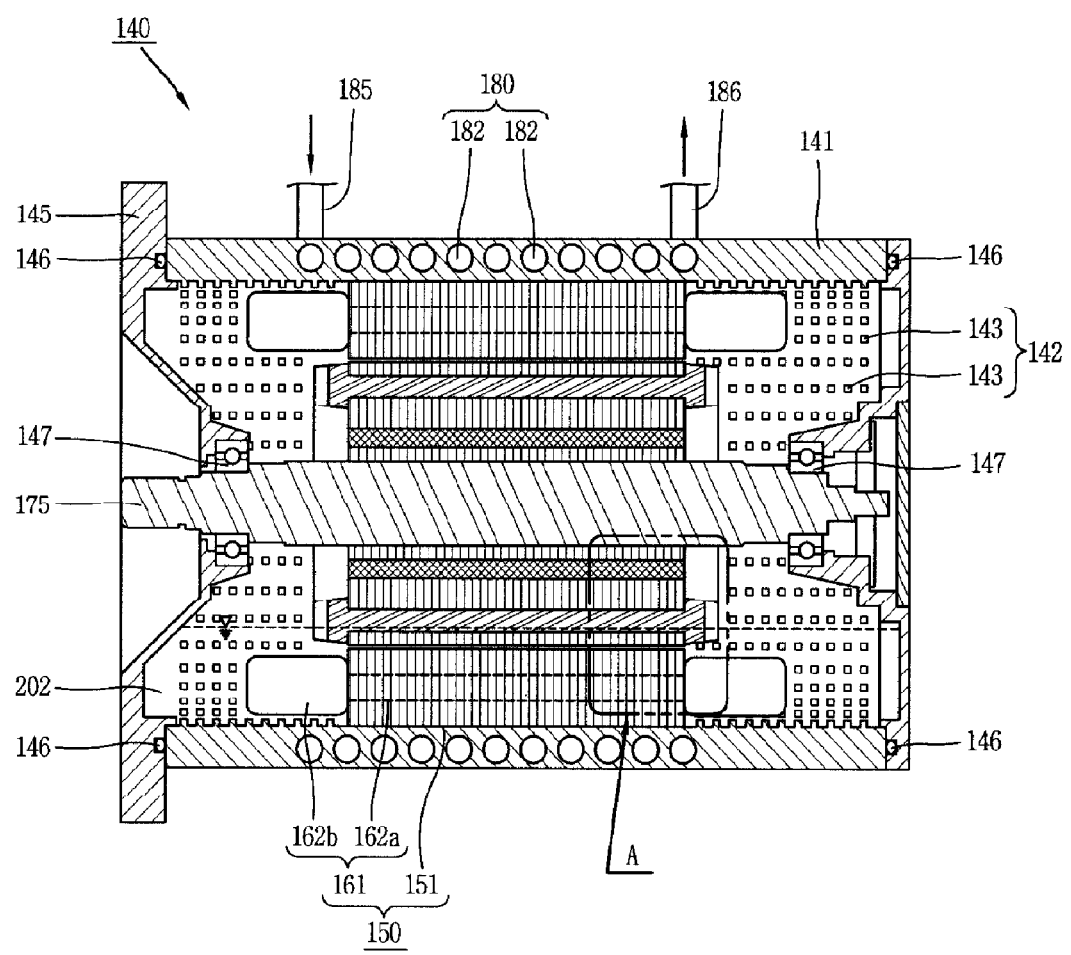
FIG. 8 is a sectional view of an electric motor according to another exemplary embodiment of the present invention.
Figure 9:
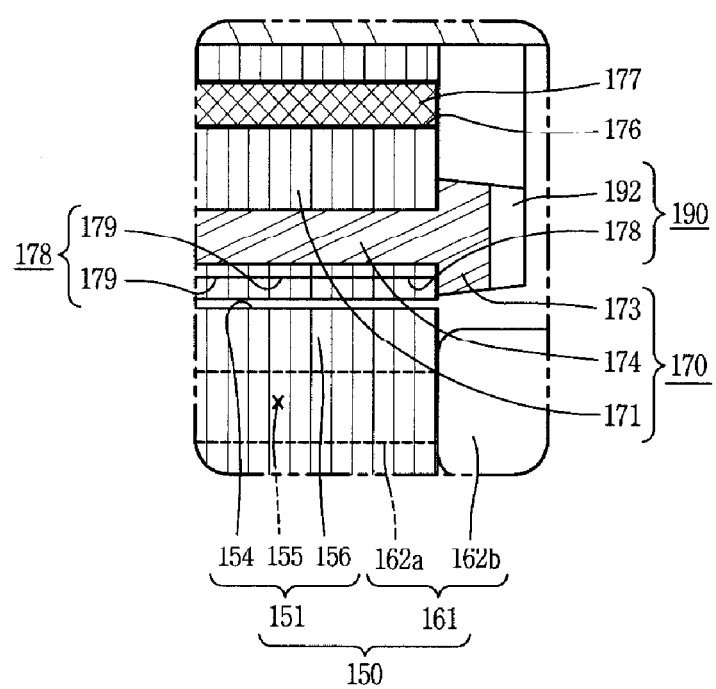
FIG. 9 is an enlarged view of a major part of FIG. 8.

As shown in FIGS. 8 and 9, the electric motor 140 may include the external case 141, the stator 150 disposed in the interior of the external case 141, the rotor 170 disposed to be rotatable with respect to the stator 150, and the oil 202 accommodated in the interior of the external case 141.

The depression and protrusion portion 142 may be formed on the inner surface of the external case 141. Accordingly, an inner surface area of the external case 141 can increase to accelerate heat-exchange.

The flow path 182 allowing the cooling fluid to flow therethrough may be formed on the external case 141.

For example, the cooling unit 180 including the flow path 182 formed therein may be coupled in the interior of the external case 141. Accordingly, the external case 141 may be heat-exchanged with the cooling fluid so as to be quickly cooled. The cooling fluid inlet unit 185 and the cooling fluid outlet unit 186 of the cooling unit 180 may be connected to the cooling fluid circulation unit 210. Accordingly, the cooling fluid, circulating by way of the cooling unit 180, can quickly cool the external case 141.

The oil 202 may be accommodated in the external case 141.

The oil 202 may be accommodated in the interior of the external case 141 such that it can sufficiently simultaneously come into contact with the external case 141, the stator 150, and the rotor 170. Accordingly, heat-exchange between the external case 141, the stator 150, and the rotor 170 can be accelerated by the medium of the oil 202.

The stator 150 may include the stator core 151 and the stator coil 161.

The rotor 170 may be rotatably disposed in the interior of the stator 150.

Meanwhile, the rotor 170 may include the rotor core 171 and a permanent magnet 177 coupled to the rotor core 171.

For example, the permanent magnet 177 may have a rectangular (bar) shape having a small thickness compared with the width and length thereof. The permanent magnet 177 may be configured to be inserted in an axial direction of the rotor core 171.

The rotor core 171 may include a permanent magnet insertion part 176 formed to be recessed or penetrate in an axial direction so that the permanent magnet 177 may be inserted in the axial direction.

Here, as the permanent magnet 177, a neodymium (Nd) magnet having a high maximum energy product, among commercial magnets, may be used.

Among neodymium magnets, a neodymium magnet having relatively low temperature characteristics, may be used as the permanent magnet 177. Accordingly, the cost for material of the permanent magnet 177 can be significantly reduced.

As widely known, the neodymium magnet may include Nd—Fe—B (Neodymium-ferrite-boron) as main ingredients and trace elements (or microelements) added to improve magnetic qualities and temperature characteristics. Since the neodymium magnet is greatly dependent upon the temperature, so a magnet having appropriate characteristics may be selectively according to temperature. The neodymium magnet has a difference in elements which are added and a fabrication process according to the temperature characteristics, and in order to improve the temperature characteristics, the fabrication cost may be highly increased.

In the electric motor 140 according to an exemplary embodiment of the present invention, an increase in the internal temperature can be restrained and the internal temperature of the external case 141 can be maintained to be a certain temperature level or lower, so the neodymium magnet having relative low temperature characteristics can be used. Thus, the cost for the material of the permanent magnet 177 can be considerably reduced.

Meanwhile, in the present exemplary embodiment, the permanent magnet 177 is inserted in the axial direction of the rotor core 171 (i.e., an IPM type), but the present invention is not limited thereto and the permanent magnet may be coupled to a circumferential surface of the rotor core 171 (i.e., an SPM type).

Also, the rotor 170 may further include a plurality of conductor bars 173 axially coupled to the rotor core 171 and an end ring 174 connecting the conductor bars 173, so as to be configured as a so-called hybrid type rotor.

With such a configuration, when power is applied to the stator 150, the stator 150 and the rotor 170 interact, and the rotor 170 may rotate about the rotational shaft 175 (by being centered thereon). As the rotor 170 starts to rotate, the stator 150 and the rotor 170 may generate heat.

When power is applied to the stator 150, the controller 220 may control the pump 214 to allow the cooling fluid to circulate by way of the electric motor 140. Accordingly, the electric motor 140 can be quickly cooled.

Meanwhile, when the rotor 170 starts to rotate, the oil 202 may circulate in the interior of the external case 141 by the oil circulation unit 190. In detail, when the rotor 170 starts to rotate, the oil 202 temporally adhered to the projections 192 may be outwardly dispersed along a radial direction by virtue of the centrifugal force. Accordingly, the contact area between the oil 202 and the stator 150 and rotor 170 increases, and also the contact area between the external case 141 and the oil 202 can increase. Thus, heat-exchange can be accelerated (or promoted).

The oil 202 is dispersed by the oil circulation unit 190 so as to be brought into contact with a larger area of the external case 141 so as to be quickly cooled. In particular, the coil end 162b of the stator coil 161 which is protruded from the stator core 151 and has a relatively high temperature is quickly cooled to restrain an increase in temperature.

Namely, the oil 202 is brought into contact with a larger area of the stator 150 and the rotor 170 by the oil circulation unit 190 to quickly cool the stator 150 and the rotor 170, and since the oil 202 is brought into a large area of the external case 141, it can be quickly cooled. Also, since the projections 143 of the external case 141 increases the surface area of the external case 141, heat-exchange between the oil 202 and the external case 141 can be further accelerated. Accordingly, the interior of the external case 141 can be evenly cooled, and the internal temperature of the external case 141 can be managed to be a certain temperature or lower.

Another exemplary embodiment of the present invention will now be described with reference to FIGS. 10 and 11.

As described above, an electric vehicle having an electric motor according to another exemplary embodiment of the present invention may include the vehicle body 110, the battery 125 provided in the vehicle body 110, and the electric motor 140 provided in the vehicle body 110 and connected with the battery 125 to provide driving force to the vehicle body 110.

Figure 10:
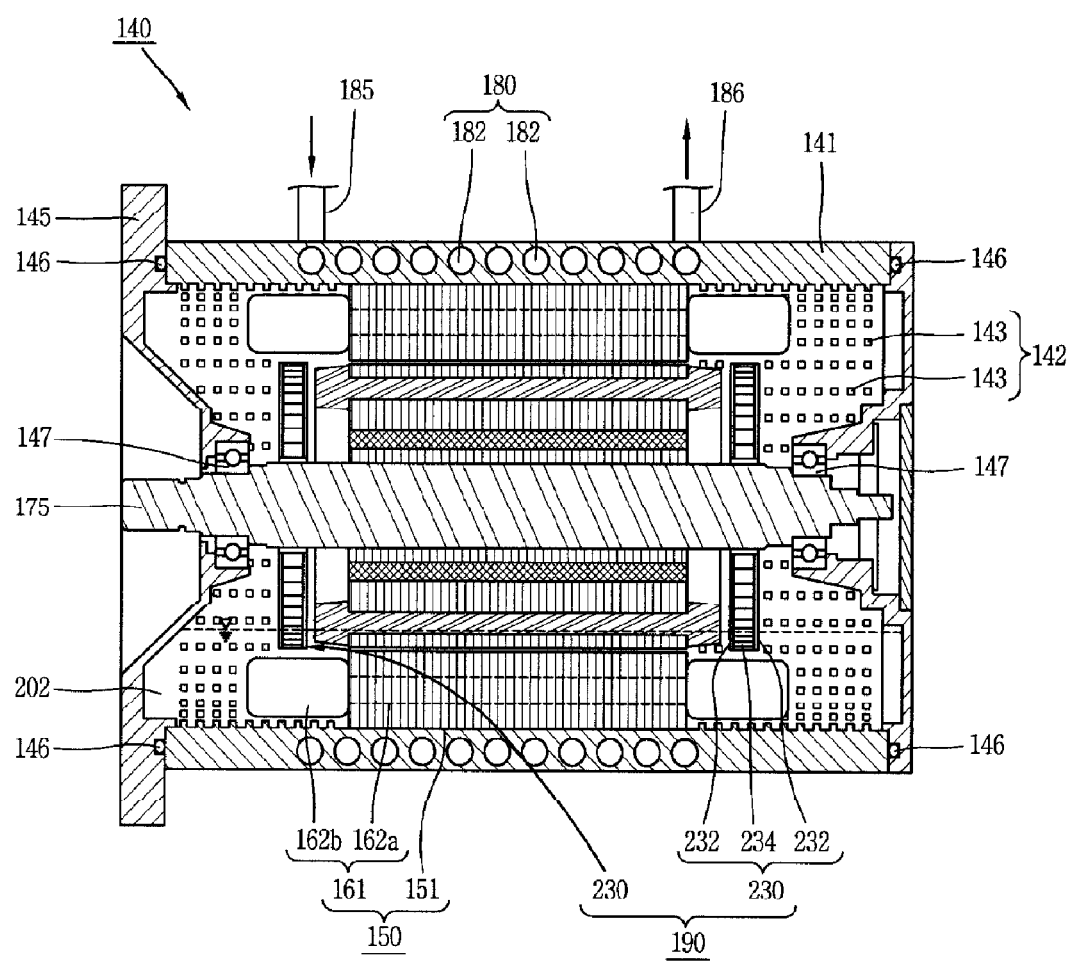
FIG. 10 is a sectional view of an electric motor according to another exemplary embodiment of the present invention.
Figure 11:
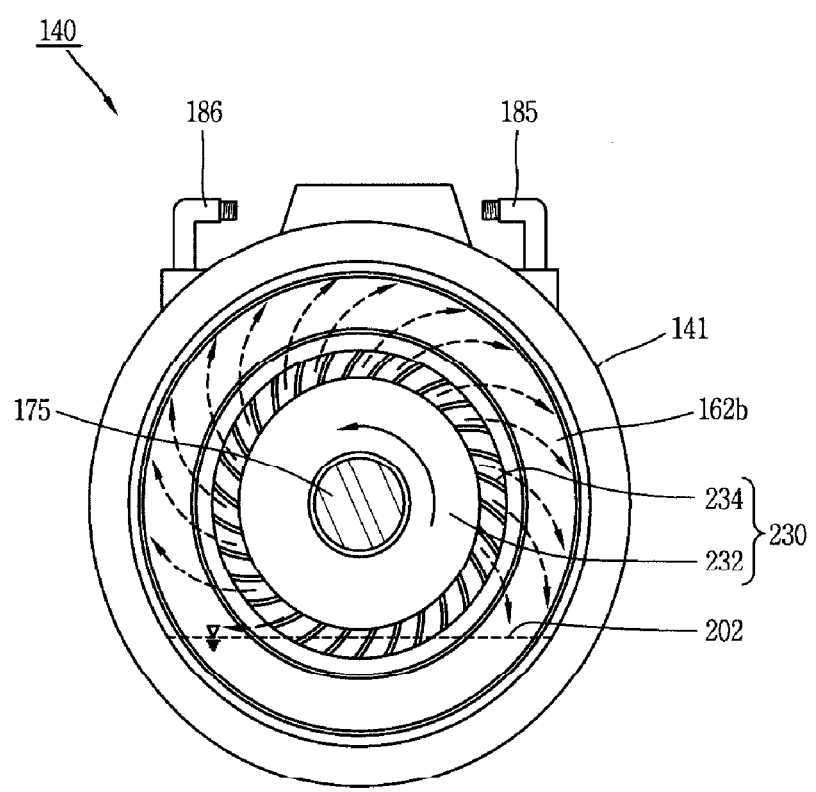
FIG. 11 is a sectional view taken along line XI-XI of FIG. 10 to explain the operation of a wheel.

As shown in FIG. 10, the electric motor 140 may include the external case 141, the stator 150 disposed in the interior of the external case 141, the rotor 170 disposed to be rotatable with respect to the stator 150, and the oil 202 accommodated in the interior of the external case 141.

The depression and protrusion portion 142 may be formed on the inner surface of the external case 141. Accordingly, an inner surface area of the external case 141 can increase to accelerate heat-exchange.

The depression and protrusion portion 142 may be configured to include, for example, a plurality of projections 143 protruded from an inner surface of the external case 141.

The flow path 182 allowing the cooling fluid to flow therethrough may be formed on the external case 141.

For example, the cooling unit 180 including the flow path 182 formed therein may be coupled in the interior of the external case 141. Accordingly, the external case 141 may be heat-exchanged with the cooling fluid so as to be quickly cooled. The cooling fluid inlet unit 185 and the cooling fluid outlet unit 186 of the cooling unit 180 may be connected to the cooling fluid circulation unit 210. Accordingly, the cooling fluid, circulating by way of the cooling unit 180, can quickly cool the external case 141.

The oil 202 may be accommodated in the external case 141.

The oil 202 may be accommodated in the interior of the external case 141 such that it can sufficiently simultaneously come into contact with the external case 141, the stator 150, and the rotor 170. Accordingly, heat-exchange between the external case 141, the stator 150, and the rotor 170 can be accelerated by the medium of the oil 202.

The stator 150 may include the stator core 151 and the stator coil 161.

The rotor 170 may be rotatably disposed in the interior of the stator 150.

Meanwhile, the rotor 170 may include the rotor core 171, the conductor bars coupled to the rotor core 171, and the end ring 174.

The rotor 170 may further include the permanent magnet 177 coupled to the rotor core 171

Meanwhile, the electric motor 140 may include the oil circulation unit 190 for circulating the oil 202 in the interior of the external case 141.

The oil circulation unit 190 may be provided at the rotational shaft 175.

For example, the oil circulation unit 190 may be configured to include an oil wheel 230 rotatably coupled to the rotational shaft 175.

A plurality of oil wheels 230 may be provided.

The oil wheel 230 may be configured to have a diameter sufficiently immersed with a certain depth in the oil 202. Accordingly, when the rotor 170 rotates, the oil 202 can be outwardly dispersed by the oil wheel 230.

The oil wheel 230 may be configured to include a wheel body 232 having a disk-like shape, and a pumping unit 234 formed on the wheel body 232.

For example, the wheel body 232 may be formed to have a diameter sufficiently immersed with a certain depth in the oil 202. Accordingly, it can smoothly be in contact with the oil 202 accommodated in the interior of the external case 141. A shaft hole 233 may be formed at the center of the wheel body 232 to allow the rotational shaft 175 to be inserted therein.

A pair of wheel bodies 232 may be configured such that they are spaced apart in an axial direction and disposed in a facing manner.

The pumping unit 234 may be provided between the wheel bodies 232.

The pumping unit 234 may be disposed at the edges of the wheel body 232.

One end of the pumping unit 234 may be disposed at the circumference of the wheel body 232 and the other end of the pumping unit 234 may be disposed toward the center of the wheel body 232 along a radial direction.

The pumping unit 234 may be formed to have an arc shape. Here, the pumping unit 234 may also be linearly formed.

The oil wheel 230 may be disposed at an inner side of the coil end 162b of the stator coil 161. Accordingly, the coil end 162b protruded from the stator core 151 and having a relatively high temperature can be quickly cooled.

The stator coil 161 may include a section 162a disposed in the slot 155 of the stator core 151, and the coil end 162b disposed to be protruded from an end portion of the stator core 151.

The section 162a disposed within the slot 155 of the stator core 151 is in contact with the stator 150. Thus, when heat is generated, a heat transmission path for transmitting heat to the stator core 151 and the external case 141 is short, easily cooling the section 162a. In comparison, the coil end 162b is protruded from the stator core 151 and the outer side of the coil end 162b is in contact with air having high insulating characteristics. Thus, the coil end 162b can hardly release heat generated during the operation, increasing the temperature.

In the electric motor 140 according to an exemplary embodiment of the present invention, since the oil 202 is dispersed to the coil end 162b by the oil wheel 230, the coil end 162b can be quickly cooled, restraining the increase in the temperature of the coil end 162b.

With such a configuration, when power is applied to the stator 150, the rotor 170 may rotate about the rotational shaft 175 (by being centered thereon). As the rotor 170 starts to rotate, the stator 150 and the rotor 170 may generate heat.

When power is applied to the stator 150, the controller 220 may control the pump 214 such that the cooling fluid circulates by way of the electric motor 140. Accordingly, the electric motor 140 can be quickly cooled.

When the rotor 170 starts to rotate, the oil 202 may circulate in the interior of the external case 141 by the oil circulation unit 190.

When the rotor 170 starts to rotate, the oil 202 may be provided to an upper area within the external case 141 by virtue of the rotary oil wheel 230.

The oil 202 may circulate the interior of the external case 141, while repeatedly performing the process of dispersing operation and the dropping operation by the oil wheel 230.

As the oil 202 comes into contact with the stator 150 and the rotor 170, the heat generation units (or heat generation sources), in the dispersing and dropping operation, the temperature of the oil 202 increases, and as the oil 202 comes into contact with the external case 141, the cooling unit, the coil 202 may be cooled. Namely, the heat of the stator 150 and the rotor 170 can be quickly transferred to the external case 141 according to the circulation of the oil 202 and then quickly discharged to the outside. Accordingly, the interior of the external case 141 can be uniformly cooled, and the internal temperature of the external case 141 can be managed to be a certain temperature or lower.

As described above, according to exemplary embodiments of the present invention, the heating components can be quickly and sufficiently cooled, thus improving the output.

Also, since the increase in the temperature of the rotor is restrained, a low-priced permanent magnet which does not have high temperature characteristics can be used. Accordingly, the cost for the material of the permanent magnet can be reduced.

In addition, since heat generated by the components is quickly discharged to the outside by using the oil and the cooling fluid, the output can be improved, and since the forcible degradation of the components is prevented, the life span of the product can be lengthened.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electric vehicle comprising:
    a body;
    a plurality of wheels provided at the body; and
    an electromotor to drive at least one wheel, the electromotor including,
    a case,
    a stator disposed in an interior of the case,
    a rotor including a shaft disposed to be rotatable with respect to the stator,
    an oil circulator to contact with oil that is accommodated or stored at the interior of the case, wherein the oil circulator disperses at least a portion of the oil when the rotor rotates with respect to the stator;
    a cooling fluid circulation circuit for circulating cooling fluid by way of the case;
    one or more flow passages at the case to flow cooling fluid therethrough;
    at least one inlet at the case in fluid communication with the one or more flow passages; and
    at least one outlet at the case in fluid communication with the one or more flow passages,
    wherein the cooling fluid circulation circuit is coupled to the at least one of the inlet and the at least one of the outlet to form a cooling fluid flow path.

2. The electric vehicle of claim 1, wherein the oil is sufficiently accommodated or stored to at least make contact with at least a portion of the rotor, at least a portion of the stator, and at least a portion of the interior of the case.

3. The electric vehicle of claim 1, further comprises one or more protrusion portions or depression portions at an inner surface of the case.

4. The electric vehicle of claim 1, further comprises one or more grooves at an inner surface of the case.

5. The electric vehicle of claim 1, wherein the rotor includes a rotor core and one or more neodymium magnets coupled to the rotor core, wherein a characteristic of the one or more neodymium magnets is based on a temperature of the motor when the motor is operating.

6. The electric vehicle of claim 1, wherein the oil circulator is located at an end portion of the rotor.

7. The electric vehicle of claim 1, wherein the oil circulator is located at an end portion of the shaft.

8. The electric vehicle of claim 1, wherein the oil circulator includes one or more protrusion portions or depression portions at a surface of the oil circulator.

9. The electric vehicle of claim 1, wherein the oil circulator includes at least two wheel bodies spaced apart in an axial direction of the shaft and a pumping unit therebetween.

10. A motor for use in an electric vehicle comprising:
    a case;
    a stator disposed in an interior of the case;
    a rotor including a shaft disposed to be rotatable with respect to the stator;
    an oil circulator to contact with oil that is accommodated or stored at the interior of the case, wherein the oil circulator disperses at least a portion of the oil when the rotor rotates with respect to the stator;
    a cooling fluid circulation circuit for circulating cooling fluid by way of the case;
    one or more flow passages at the case to flow cooling fluid therethrough;
    at least one inlet at the case in fluid communication with the one or more flow passages; and
    at least one outlet at the case in fluid communication with the one or more flow passages,
    wherein the cooling fluid circulation circuit is coupled to the at least one of the inlet and the at least one of the outlet to form a cooling fluid flow path.

11. The motor of claim 10, wherein the oil is sufficiently accommodated or stored to at least make contact with at least a portion of the rotor, at least a portion of the stator, and at least a portion of the interior of the case.

12. The motor of claim 10, further comprises one or more protrusion portions or depression portions at an inner surface of the case.

13. The motor of claim 10, further comprises one or more grooves at an inner surface of the case.

14. The motor of claim 10, wherein the rotor includes a rotor core and one or more neodymium magnets coupled to the rotor core, wherein a characteristic of the one or more neodymium magnets is based on a temperature of the motor when the motor is operating.

15. The motor of claim 10, wherein the oil circulator is located at an end portion of the rotor.

16. The motor of claim 10, wherein the oil circulator is located at an end portion of the shaft.

17. The motor of claim 10, wherein the oil circulator includes one or more protrusion portions or depression portions at a surface of the oil circulator.

18. The motor of claim 10, wherein the oil circulator further comprises at least two wheel bodies spaced apart in an axial direction of the shaft and a pumping unit therebetween.

19. An electric vehicle comprising:
- a body;
- a plurality of wheels provided at the body; and
- an electromotor to drive at least one wheel, the electromotor including,
- a case,
- a stator disposed in an interior of the case,
- a rotor including a shaft disposed to be rotatable with respect to the stator, and
- an oil circulator to contact with oil that is accommodated or stored at the interior of the case, wherein the oil circulator disperses at least a portion of the oil when the rotor rotates with respect to the stator,
- wherein the rotor includes a rotor core and one or more neodymium magnets coupled to the rotor core, wherein a characteristic of the one or more neodymium magnets is based on a temperature of the motor when the motor is operating.

20. A motor for use in an electric vehicle comprising:
- a case;
- a stator disposed in an interior of the case;
- a rotor including a shaft disposed to be rotatable with respect to the stator; and
- an oil circulator to contact with oil that is accommodated or stored at the interior of the case, wherein the oil circulator disperses at least a portion of the oil when the rotor rotates with respect to the stator,
- wherein the rotor includes a rotor core and one or more neodymium magnets coupled to the rotor core, wherein a characteristic of the one or more neodymium magnets is based on a temperature of the motor when the motor is operating.

* * * * *